United States Patent [19]

Mayo

[11] 3,889,522
[45] June 17, 1975

[54] PIPELINE CONDITION ANALYZER

[75] Inventor: Kenneth E. Mayo, Nashua, N.H.

[73] Assignee: Sanders Associates, Inc., Nashua, N.H.

[22] Filed: Aug. 21, 1972

[21] Appl. No.: 282,318

[52] U.S. Cl.............................................. 73/40.5 R
[51] Int. Cl. ............................................... G01m 3/08
[58] Field of Search................ 73/40.5 R, 191, 152; 166/179

[56] References Cited
UNITED STATES PATENTS

| | | | |
|---|---|---|---|
| 3,117,453 | 1/1964 | Ver Nooy | 73/40.5 R |
| 3,620,077 | 3/1970 | Brown et al. | 73/151.5 |
| 3,754,275 | 8/1973 | Carter et al. | 73/40.5 R |

*Primary Examiner*—Donald O. Woodiel
*Attorney, Agent, or Firm*—Louis Etlinger; Richard I. Seligman

[57] ABSTRACT

A pipeline condition analyzer includes pigging apparatus which can be accommodated to different diameter pipelines. A pressure transducer on board the pig monitors the changes in the pressure of a pipeline segment isolated by the pig due to pipeline characteristics and leaks in the pipeline. This information is recorded on tape as an FM signal by an onboard recorder. A radiation source on board the pig directs a beam of radiation toward the wall of pipe where it undergoes Compton scattering. A detector is positioned to intercept the back-scattered radiation which varies in accordance with the wall thickness. The output of the detector reflecting changes in wall thickness due to pipeline characteristics and corrosion is recorded as a second FM signal on the tape. After the pig traverses the pipeline, the tape is removed and the signals thereon processed to display an accurate pressure profile and wall thickness profile of the pipeline. The system includes an automatic threshold and alarm capability so that one need scrutinize only signals which are characteristic of leaks or incipient leaks.

6 Claims, 3 Drawing Figures

PIPELINE CONDITION ANALYZER

BACKGROUND OF THE INVENTION

This invention relates to a pipeline condition analyzer. It relates more particularly to surveying apparatus for detecting and locating actual and incipient leaks in inaccessible pipelines.

In view of the current emphasis on the prevention of environmental pollution, the early detection and location of leaks in pipelines under ground and under water is of critical importance both in terms of the consequences to the environment and the possible penalties involved.

One prevalent technique for making internal surveys of pipelines to detect leaks involves the use of a capsule or "pig" which is inserted into the pipeline at one end and is propelled by the fluid flowing through the pipe to the other end. The pig consists essentially of an elongated tubular member having seals extending radially outward from the member in sealing relation with the inside wall of the pipeline. Instruments are mounted inside the pig which detect the noise associated with fluid issuing through a leakhole or which otherwise sense the presence of a leak. U.S. Pat. Nos. 2,940,302; 2,951,362; 3,117,453 and 3,483,734 illustrate typical devices of this type.

Although pipeline surveying devices are fairly common, they are not completely satisfactory in use. In the first place, each pig is designed for a certain size pipe. This means that a large number of pigs must be inventoried in order to survey all of the pipelines in use. Also, the prior apparatus is not able to pinpoint the location of very small leaks or incipient leaks (i.e. a badly pitted or eroded pipe).

Also, it is fairly difficult and time-consuming to analyze the results generated by the usual surveying equipment. This is because the results usually appear in the form of a tracing on a display or strip chart. In the former case, the operator becomes so accustomed to seeing a normal trace, he may easily fail to spot a leak-indicating signal. In the latter case, the operator must pore over miles of strip chart tracings in order to determine the condition of a pipeline.

There are other deficiencies in the prior surveying equipment such as complexity, high maintenance costs and slow playback analysis, all of which militate against the wider use and application of pipeline surveying pigs of this general type.

SUMMARY OF THE INVENTION

Accordingly, the present invention aims to provide a pipeline condition analyzer which not only detects actual leaks, but also incipient ones.

Another object is to provide an analyzer of the type which can pinpoint the location of an abnormality in the pipeline.

A further object of the invention is to provide pipeline surveying apparatus which is easily and inexpensively maintained.

A further object of the invention is to provide a pipeline surveying pig which can be used by relatively unskilled personnel.

Another object is to provide a pig of this type which can traverse a variety of different diameter pipelines.

Yet another object of the invention is to provide pipeline surveying apparatus which facilitates analysis of the survey results.

A further object of the invention is to provide pipeline surveying apparatus which can be analyzed in a minimum time and with minimum operator effort.

Other objects will in part be obvious and will in part appear hereinafter.

The invention accordingly comprises the features of construction, combination of elements and arrangement of parts which will be exemplified in the construction hereinafter set forth and the scope of the invention will be indicated in the claims.

Briefly, the present system is composed of two components: to wit, pigging apparatus which traverses the pipeline being surveyed and a playback analyzer which analyzes the results of the survey. The pig includes fore and aft radial seals which entrap a given moving volume of pipeline fluid as the pig is carried along by the fluid flowing through the pipe. However, the seals are carried on a removable jacket surrounding the main body of the pig which contains the surveying equipment. This jacket comes in a variety of sizes to accommodate the pig to the different diameter pipes presently in use.

A pressure transducer inside the pig monitors the pressure of the entrapped fluid and develops a corresponding voltage which is used to modulate the frequency of a carrier signal continuously recorded on tape by an onboard tape recorder. Thus, as the pig traverses the pipeline, FM signals are recorded on the tape which represent the pressure profile of the pipe.

The recording of the information in the form of an FM signal enables one to use low-cost tape-recording equipment and still achieve maximum signal reliability.

As the pigging apparatus traverses the pipeline, every elbow, bend, T, or other such fitting normally in the pipeline produces a unique pressure-time signature on the recording tape. For example, a significant leak in the pipeline results in an abrupt frequency shift in the recorded pressure record since the entrapped volume of fluid is exhausted quickly through the leakhole as the pig passes the leak. Similarly, if the pig passes a T-fitting leading to a branch line, a smaller frequency shift is recorded signalling that fact. The pressure-time signature left by each such fitting, elbow, or the like, is unique and is reproducible. Accordingly, it can be correlated with prior and future runs of the pig through the same pipeline, even though the fluid velocity, pumping rate or fluid pressure may be changed. Thus, each new pressure-time signature which occurs signifying a leak is readily apparent. Furthermore, it can be located precisely because of its relationship to the signatures caused by known pipeline fittings.

As the subject pigging apparatus traverses the pipeline, it also detects and locates incipient leaks. More particularly, the pigging apparatus carries a collimated source of gamma radiation which helically scans the inside wall of the pipe. When the photons from the source strike the wall of the pipe, they undergo Compton scattering.

A detector is mounted on the pig which counts the back-scattered photons. It can be shown that the number of back-scattered photons incident on the detector and, accordingly, the detector count, is proportional to the thickness of the pipe wall. Accordingly, if the pipe wall is the correct thickness, the detector will count a determined number of photons. On the other hand, if the wall is unusually thin at a given location due to pitting, corrosion, erosion, or the like, then when the source scans that location, the number of photons scattered will drop momentarily, resulting in a momentary decrease in the count from the detector.

By the same token, when the pig traverses a section of pipe containing an exterior jacket or saddle, this appears as an increase in wall thickness and thus results in an increase in the number of back-scattered photons and a corresponding increase in the count from the detector.

The output of the detector is processed and recorded as an FM signal on the recording tape onboard the pig. Thus, the tape also carries a complete profile of the pipe wall thickness, indicating not only badly corroded parts of the pipe, but also fixed identification points such as saddles, T's, etc., by which the location of those damaged areas can precisely be determined.

After the pig completes its traverse of the pipeline, it is removed from the pipe through a suitable fitting provided for that purpose. The tape record is then analyzed. This analysis can be carried out on the spot or, more preferably, the tape can be forwarded to a central facility which is specially outfitted to process similar tapes sent in from many different locations.

At this facility, the tape is played back and the signals recorded thereon are processed so as to indicate the existence of actual or incipient leaks in the pipeline as well as their precise locations.

In its simplest form, the analyzer demodulates the recorded FM signals and displays the data as an accurate pressure versus time record and a detector count versus time record. However, the visual analysis of hours of recordings is not only tedious and time-consuming, but also prone to errors in interpretation. This is primarily because the person analyzing the recorded data becomes fatigued and may overlook a segment of a recorded trace indicating an actual or incipient leak.

In order to avoid this problem, the present system has an automatic fast-scan capability coupled with a transient detection and alarm capability. These enable the system to automatically scan the recorded data and then when it detects a transient indicating an abnormal condition, it stops the scan and sounds an alarm, apprising the operator of that fact. The operator can then carefully examine the portion of the record that is suspect. Since the operation of the present system depends not on the absolute pipeline pressure or detector count, but rather on their rates of change, it is feasible to examine in detail every transient that is greater than normal straight pipe variation. In other words, it is only necessary or useful to examine the transient occurrence in detail. Operating experience with an individual pipeline quickly yields a repeatable record of the normal transients caused by fittings, branch lines, etc., so that interpretation analysis can quickly discount these transients as known normal fluctuations.

The electronic equipment required to perform the aforesaid automatic screening analysis is fairly simple. It consists of electronic circuitry which differentiates the recorded signals and gives an output which is a function of the rate of change of that signal. Thus, in the case of the pressure information, a slow pressure change such as is normally associated with a normal pipeline frictional pressure drop or with elevation variations results in a very small output signal. On the other hand, a more rapid pressure change due to a fitting or a pipe diameter change, will yield a momentary output which is correspondingly higher. These transients can be rejected selectively for alarm or identified for examination by appropriate adjustment of an alarm threshold.

A substantial pipeline leak produces a significantly high transient signal while a small leak might have a transient characteristic which is similar to that produced by a T or a valve in the pipeline. However, by comparing the information produced by several runs through the pipeline and by knowing the location of the valves and T's, the transients caused by the pipeline fittings are easily distinguished from the transients produced by small leaks.

The present system can also include an oscilloscope display, visual alarm, and similar refinements which speed the analysis or aid in the interpretation and visualization of the recorded information. The oscilloscope display feature is particularly desirable because its dynamic response is faster than that of most recorders. Accordingly, it can show very high transient rates. Further, the display can visualize the signal without creating reams of hard paper copy.

The present system has other advantages which will become apparent from the following detailed description.

BRIEF DESCRIPTION OF THE DRAWINGS

For a fuller understanding of the nature and objects of the invention, reference should be had to the detailed description below taken in connection with the accompanying drawings, in which.

DESCRIPTION OF THE PREFERRED EMBODIMENT

Figure 1:
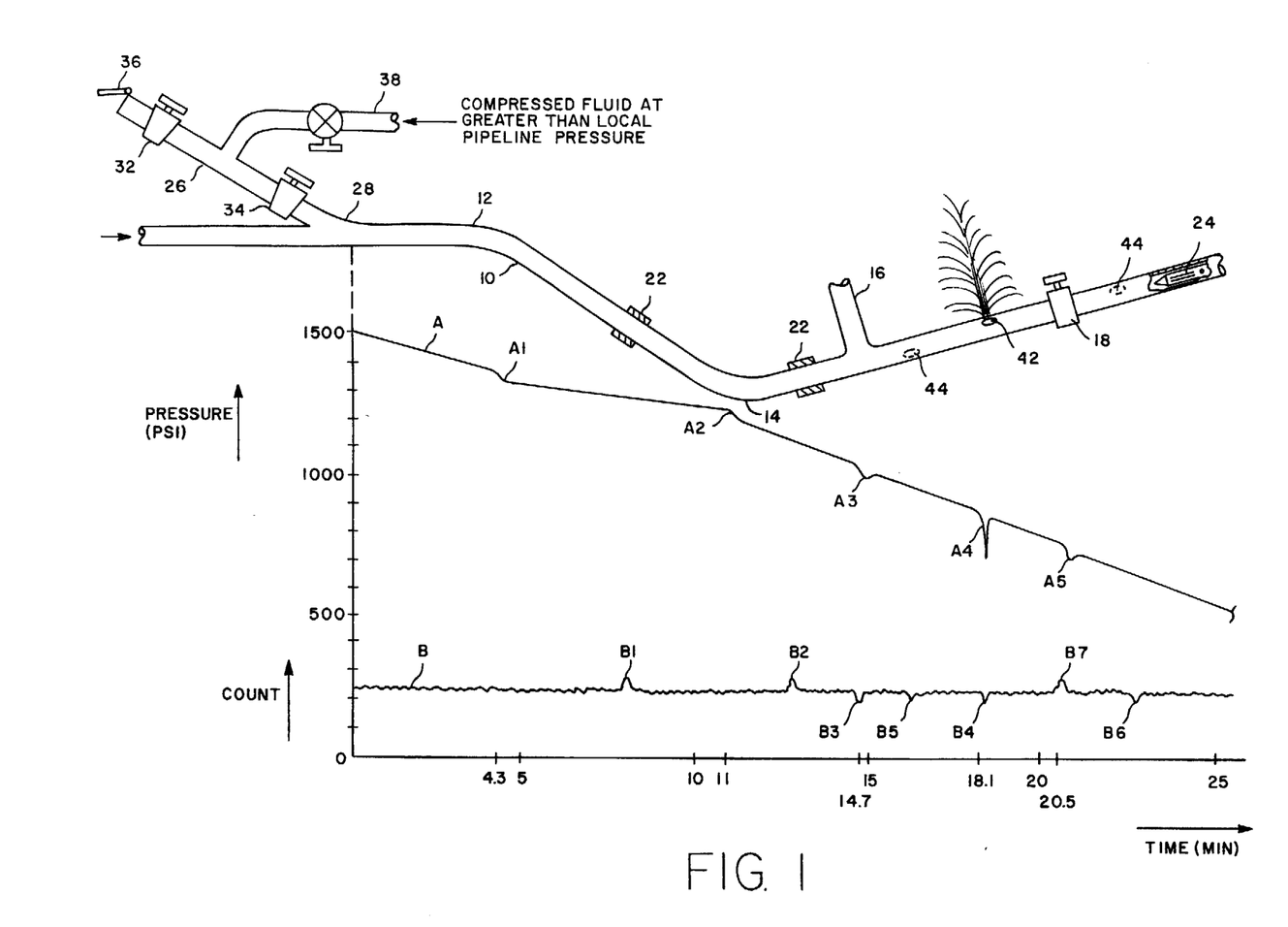
FIG. 1 is a diagrammatic view including a graph illustrating the operation of a pipeline condition analyzer embodying the principles of this invention.

Turning now to FIG. 1 of the drawings, a typical underground or underwater pipeline is shown generally at 10. It has a pair of bends 12 and 14, a branch line indicated at 16 and a valve 18. Also, a pair of couplings or saddles 22 are clamped on the pipe to connect adjacent sections thereof. A fluid such as oil is flowing through the pipeline from left to right at a flow rate which is typically on the order of 10 feet per second.

The pipeline surveying apparatus which is the subject of the present invention includes a pig 24 which is introduced into the pipeline 10 through a lock shown generally at 26, known in the oil industry as a "lubricator connection". Lock 26 is comprised of a stub branch 28 having a pair of manually operated gate valves 32 and 34 spaced along its length. The open end of the stub branch 28 is sealed off by a hatch cover 36.

In order to insert the pig 24 into the pipeline, the gate valve 34 is closed while valve 32 and cover 36 are opened. The pig is slid into the space between valves 32 and 34 and then the hatch and valve 32 are closed. Following this, pipeline fluid under pressure is introduced into the space between the aforesaid two valves by means of a valved pipe 38 which leads to a pumped source (not shown). After the fluid in the stub branch 28 is brought up to a pressure slightly in excess of the pipeline 10 pressure, valve 34 is opened so that pig 24 is pushed into the pipeline. Whereupon valve 34 is closed and the pressure released from stub branch 28.

Pig 24 is carried along by the fluid in the pipe so that it shuttles along the pipeline at substantially the fluid flow rate. After the pig traverses the pipeline, it is removed through another lock similar to lock 26.

As pig 24 moves through the pipe, it isolates an adjacent segment of the pipe. The pig carries pressure detection and recording equipment which allows it to monitor the fluid pressure in this moving isolated segment and thereby obtain a permanent pressure profile of the entire pipeline. This profile for the pipe 10 is illustrated by the pressure versus time plot A in FIG. 1. As seen from this graph, after the pig enters the pipe, it detects a pipeline pressure of, say, 1500 psi. In a straight section of pipe with no fittings, the pressure would drop gradually due to fractional losses, eddies, etc., to some lower value at the end of the pipe, e.g. 100 psi.

In the illustrated pipe, the bend 12 causes a small pressure drop which is detected by the pig 24 and reflected at point $A_1$ on the curve. Similarly, as the pig 24 passes elbow 14, it detects an additional pressure drop which is seen at point $A_2$ on curve A. When pig 24 passes the branch line 16, the pressure in the pipeline segment isolated by the pig drops momentarily due to the opening into the branch line so that the pressure record shows a corresponding momentary drop in pressure which appears at point $A_3$ on the curve.

The pipeline is shown as having a leak 42. As the pig 24 isolates the pipeline segment containing this leak, it detects a relatively large pressure drop which appears at point $A_4$ on the curve. Finally, the valve 18 causes a small pressure drop appearing at point $A_5$ on the curve.

Thus, as it travels through the pipe, pig 24 develops a pressure-versus-time record which includes the characteristic signatures of pipeline leaks (i.e. curve transient $A_4$). Since one knows the approximate speed of the pig through the pipeline, one can then calculate the locations of the leaks. In certain cases, there may be perturbations in the velocity of the pig through the pipeline caused by eddy currents, friction, constrictions, etc., which might give rise to errors in the computed location of the leak. However, the present system keeps this to a minimum because the pressure-versus-time record also reflects pressure changes caused by the bends and fittings in the pipeline. The locations of these elements are known and each produces a unique pressure-versus-time signature on the curve A, despite fluctuations in the fluid flow rate, fluid pressure or pumping rate. Consequently, these characteristic signatures can be used to check the computed location of a leak site.

Still referring to FIG. 1, as it traverses the pipeline, pig 24 also develops a record showing the wall thickness of the pipeline. As will be described in more detail later, the wall of the pipe is scanned by a radiation source onboard the pig. The amount of back-scattered radiation is dependent upon the thickness of the pipe wall and the intensity of this back-scattered radiation is monitored. The radiation count versus time profile for pipeline 10 is shown as plot B in FIG. 1. As seen from the figure, there is an increase in the radiation count at points $B_1$ and $B_2$ on the curve due to the presence of saddles 22 which effectively increase the thickness of the pipeline wall at those points.

As the pig 24 passes the branch line 16, the pig detects a reduction in the thickness of the pipeline caused by the opening into the branch. This is reflected by a momentary drop in the radiation count as shown at point $B_3$ on the curve. Likewise, as the pig passes the leak site 42, there is a momentary drop in the radiation count as seen at point $B_4$ on the curve. Pipe 10 is also depicted as having pitted regions at 44. At these regions, the wall thickness is less than normal and they constitute possible future leak sites. The decreased wall thickness at these regions cause a transient decrease in the radiation count at the corresponding points $B_5$ and $B_6$ on the curve. This decrease is, of course, somewhat less than the ones at points $B_3$ and $B_4$. Finally, valve 18 effectively increases the thickness of the pipe wall which is reflected on curve B as a transient increase in the count at point $B_7$.

Thus, after the pig 24 has traversed pipeline 10, it contains a permanent record of the pressure profile of the pipeline which indicates actual leaks. It also contains a permanent record of the intensity of the radiation back-scattered from the pipeline wall which, in turn, reveals the location of weak spots in the wall which could mature into actual leak sites. As will be described in more detail later, these records are removed from the pig and processed in the system's analyzing section to pinpoint the actual locations of these problem areas in a minimum amount of time and with a maximum amount of reliability.

Figure 2:
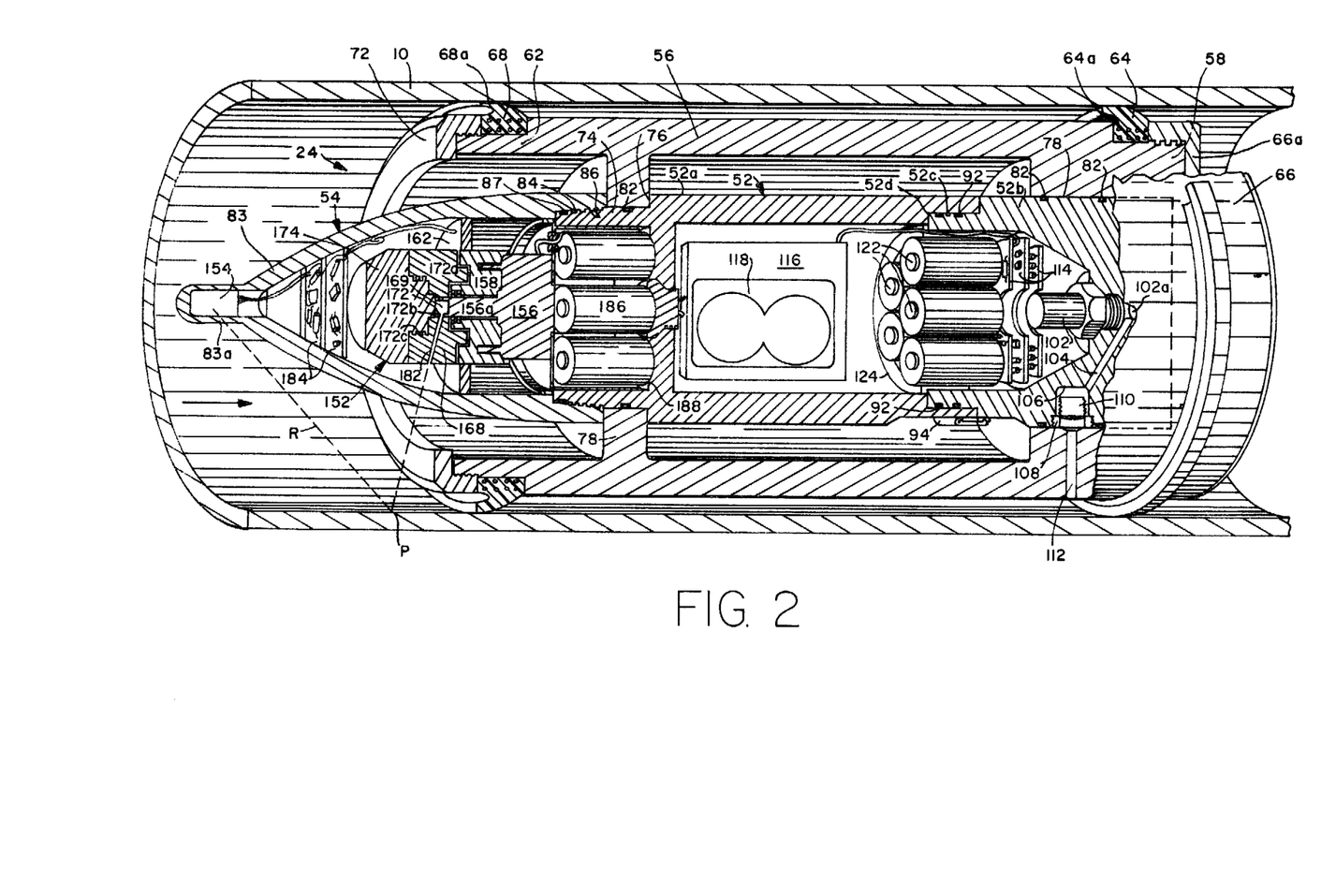
FIG. 2 is a sectional view with parts shown in elevation of the pigging apparatus which is an essential part of the FIG. 1 system.

Turning now to FIG. 2, pig 24 is comprised of three basic parts. A pressure record cannister 52 contains all of the components which are required to enable the pig to develop a record of the pressure in the pipeline 10. A radiation source and detector unit shown generally at 54 contains the elements required to enable the pig to survey pipe wall thickness as described above. Finally, the pig includes an outer jacket or shell 56 which carries the radial seals which guide the pig in the pipeline and enable the pig to isolate a segment of the pipeline as it travels through the pipe. The cannister 52 and unit 54 have a selected definite size which is less than the smallest diameter pipeline in which it will be used. Shell 56, on the other hand, is made in a variety of different sizes to adapt the cannister 52 and unit 54 to each particular pipeline diameter. In other words, the shell 56 is arranged to encase a standard size cannister 52 and unit 54, but the outside diameter of each shell 56 is governed by the diameter of the pipeline which is being surveyed. In practice, then, the pigging apparatus is supplied along with a number of different diameter shells 56 to enable the pig to traverse pipelines having a variety of different diameters.

Shell 56 is basically a cylindrical tube. The front end of the tube (i.e. the right-hand end of the figure) has a reduced diameter neck 58, a portion of which is threaded. Similarly, the rear end of the tube has a reduced diameter threaded neck 62. A circular seal 64 is seated on neck 58. The seal includes a conforming ring 64a which extends out away from shell 56 and slidably engages the inside wall of pipe 10. Seal 64 is held in place by a threaded collar 66 which is turned down onto the threaded neck 58.

A similar arrangement is provided at the rear end of the shell. More particularly, a circular seal 68 is slid onto the neck 62 with its ring 68a arranged to engage the pipe wall. The seal is held in place by a threaded collar 72 which is turned down onto the neck so that the seal 68 is retained between the collar and the shell body. With this arrangement, the seals 64 and 68 can easily be replaced should they deteriorate or become damaged through prolonged use. One simply removes the collars 66 and 72 and installs new compliant seals. The rest of shell 56 is not subject to wear and thus has a very long lifetime.

Cannister 52 is slid into shell 56 through the front (i.e. right) end of the shell. The cannister is necked down at 74, forming a shoulder 76 which seats against a shoulder 78 inside the shell. The inside diameter of shell 56 is reduced near its front end at 78 so that the cannister is snugly received within the shell at that point. Once the cannister is in place, it is retained there by the collar 66 which has a portion 66a overhanging the end of the cannister. Desirably, also, O-ring seals 82 are provided in the cannister neck portion 74 and around the cannister near its front end opposite the shell portion 78 to insure a snug fit between the shell and the cannister.

The radiation source and detector unit 54 has a projectile-shaped housing 83 which protrudes out through collar 72. The base of the housing is internally threaded at 84 and is turned down onto the cannister neck 74 which has corresponding threads 86. Preferably, an O-ring seal 87 is provided around neck 74 to seal the joint between housing 83 and neck 74. When housing 83 is properly seated, it butts against the shoulder 78 and helps to retain cannister 52 in place.

In those situations where it is not intended to survey pipe 10 for incipient leak sites, the source and detector unit 54 can be dispensed with because it contains no components necessary for the proper operation of the pressure detection portion of the system carried in cannister 52. Unit 54 is removed simply by unscrewing it from the threaded neck 74 and extracting it through collar 72. A suitable internally threaded cover (not shown) is then screwed down onto the neck 74 in its place.

Still referring to FIG. 2, cannister 52 is comprised of two sections 52a and 52b having interfitting ends 52c and 52d, respectively. A pair of O-ring seals 92 are provided between the sections to prevent leakage through this joint into the cannister and the two sections are held together by two or more over-center type clamps 94. This mode of securement is sufficient because even though the pipeline pressures may be as high as 1500 psi, the pressure is exerted radially inward on the cannister and axially inward toward the separation joint and thus has no tendency to pull the cannister sections 52a and 52b apart in the axial direction.

The pressure is detected by means of a pressure transducer 102 mounted in the front wall of the cannister section 52b. A change in the pressure applied to transducer 102 causes a corresponding change in its electrical output. The pressure in the pipeline 10 segment isolated by seals 64 and 68 is transmitted to transducer 102 through shell 56 and through the wall of cannister section 52b. Specifically, a small passage 104 extends between the pressure inlet 102a of transducer 102 and a recess 106 in the outside wall of cannister section 52b. The mouth of recess 106 is closed off by a ported cover 108 which includes a filter 110 extending over the ports. When the cannister is properly seated inside shell 56, the cover 108 is aligned with a passage 112 which extends through the wall of shell 56 and communicates with the trapped pipeline volume between the two seals on the pig. The pressure in the isolated pipeline volume is thus transmitted through passages 112 and 104 to transducer 102. If the pig encounters a leak in the pipeline, there is a rapid drop in the fluid pressure which is transmitted to the transducer and causes a decrease in its electrical output.

The output of transducer 102 is processed by an electronic circuit carried by printed circuit cards 114 positioned inside cannister section 52b. This circuit which will be described later develops a modulated FM signal which is applied to a tape recorder 116 and recorded on magnetic tape in a cassette 118 mounted in the recorder. The recorder is a conventional rugged, low cost, commercial recorder which is electronically modified to handle FM signals.

Cannister 52 also carries a power supply illustrated here as batteries 122 which power recorder 116 as well as the components on the printed circuit cards 114. Batteries 122 are clustered together within a resilient collar 124 which fits snugly inside the cannister section 52b and holds the batteries firmly in place.

Transducer 102 and the printed circuit cards 114 are all potted so that they are protected against moisture and dirt and are able to withstand the shock forces normally encountered by the pig. Also, the tape deck 116 is shock-mounted so that it suffers minimal vibration when the pig is in use. After the pig traverses the pipeline, the recorded information can be recovered quickly and easily by removing cannister 52 from shell 56, separating the cannister section 52a and 52b and replacing the tape cassette 118 with a fresh cassette.

A large variety of the common ills which plague low-cost commercial tape recorders such as head wear, tape dust accumulation, tape reversal, friction and the like can cause amplitude modulation in the recorded signals. In order to avoid this problem, the present system records the pressure in the pipeline as an FM signal. In this way, the FM signals can be restored to amplitude fidelity if they are simultaneously recorded with a time track. In the present instance, the time track consists of a stable tone or frequency which is recorded on a separate track on the tape and used as a tape speed reference. Thus, any signal distortion that may occur in the recorder can only come from tape speed variations and these variations can be restored simply by restoring the proper timing frequency. Also, timing pulses are superimposed on the timing track and used for an elapsed time reference.

Figure 3:
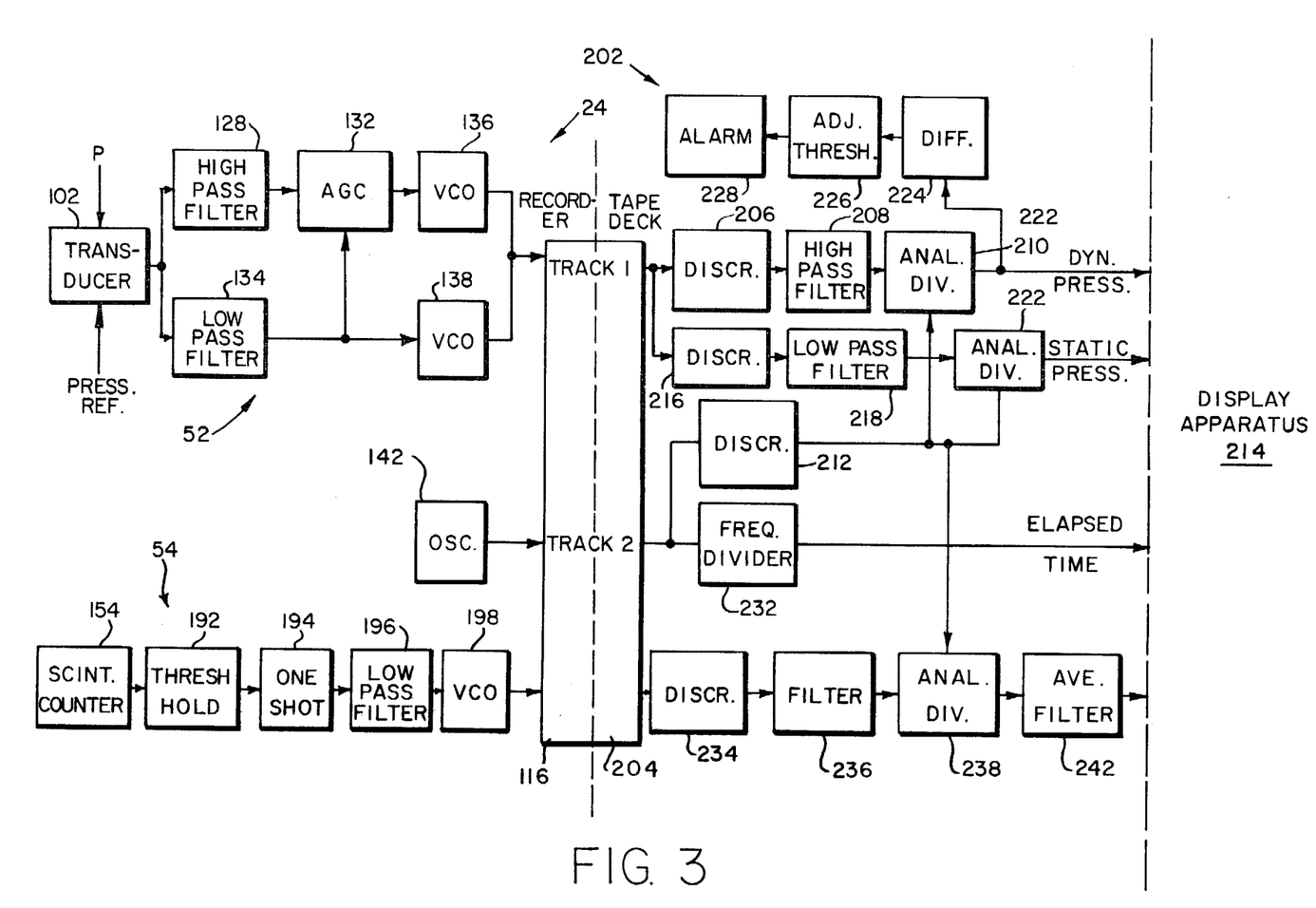
FIG. 3 is a block diagram showing in detail the analyzing section of the FIG. 1 apparatus.

FIG. 3 shows the electrical component functions of the present system in greater detail. The pressure transducer 102 develops an output signal in response to the applied pressure P. Also, the transducer has an adjustable pressure reference so that it can be set to respond over a selected pressure range.

Recording the output of the transducer on one channel of the cassette tape is impractical because of the wide range of static pressures encountered in a typical pipeline (e.g. 100 to 1500 psi). In other words, the amplitude of any transient or signature component caused by a leak in the pipeline decreases with the static pressure decrease. Thus, for example, if the signature signal has a 10:1 dynamic range, when this signal is superimposed on the static signal having a 15:1 dynamic range, a single channel system would have to respond to signals over a 150:1 dynamic range. The present system overcomes this difficulty by dividing the pressure signal into two components: to wit, a dynamic component and a static component. The static component is used as an input to an automatic gain control circuit so that the dynamic component of the signal is insensitive to changes in the static pressure.

More specifically, the output of the transducer 102 is applied by way of a high pass filter 128 to a conventional automatic gain control circuit 132. Thus, circuit 132 receives a signal which reflects the dynamic component of the pressure signal. The transducer output is also applied by way of a low pass filter 134 to the control input of the automatic gain control circuit 132 so that the gain of that circuit increases as the static pressure component of the transducer signal decreases. The output of circuit 132 is then applied to a voltage-controlled oscillator 136 whose output signal is used to drive a head in recorder 116.

The signal from the low pass filter 132 is also applied to a second voltage-controlled oscillator 138 whose output is applied to the recorder. Thus, the signal recorded on TRACK 1 of the cassette tape consists of a tone which is frequency-modulated by the dynamic component of the pressure signal and which carries all of the signature signals reflecting the characteristics of the pipeline such as bends, T's, valves, etc. The signal, of course, also carries the signature of a leak such as leak 42 in FIG. 1.

As mentioned previously, a stable tone or frequency is also recorded as a tape speed reference. This signal is applied to a second recording head in recorder 116 by a fixed frequency oscillator 142. This tone which is recorded on TRACK 2 of the tape is used to control the playback speed when the operator is analyzing the recorded signal as will be described later so that any signal distortion caused by tape speed variations can be remedied by restoring the timing frequency during the playback process.

Referring again to FIG. 2, all of the elements required for the system to detect incipient leaks are contained in the unit 54. More particularly, a rotary radiation source shown generally at 152 directs a beam of radiation at the wall of pipe 10 along the helical track as the pig travels through the pipeline. In accordance with the Compton effect, a certain percentage of the photons impinging on the pipe walls are back-scattered toward a scintillation counter 154 positioned within a protuberance 83a situated at the tail end of housing 83. The general path of these back-scattered photons is indicated by the dotted line R in FIG. 2.

The amount of back-scattered radiation sensed by counter 154 is proportional to the thickness of the pipe wall at the point P where the beam strikes the wall. The pipe 10 normally has a selected wall thickness. However, at a given point along its length, the wall may appear thicker due to the presence of couplings, saddles and valve fittings, such as those illustrated in FIG. 1. Also, at a given location, the pipe may appear thinner than normal because of a connection with a branch line or because of pits, corroded spots or actual holes, examples of which are also shown in FIG. 1. If the radiation beam sweeps over a portion of the pipeline having one of these thickness discontinuities, this fact is registered by the counter 154 as an increase or decrease in the count of back-scattered radiation. For example, if the beam impinges on a corroded spot 44 in FIG. 1, there is a momentary drop in the radiation count from the counter. If the beam sweeps over the hole 42, there is an even larger momentary decrease in the radiation count because at that instant many of the photons pass out through the hole without Compton back-scatter. By the same token, if the beam impinges on the pipe at the site of a saddle 22 or a valve 18, there is an increase in the radiation count. Thus, as seen from the curve B in FIG. 1, each of these pipeline characteristics produces a corresponding signature on the radiation count profile of the pipeline.

Still referring to FIG. 2, the rotary radiation source is comprised of an electric motor 156 which is secured to a bearing assembly 158. Assembly 158 is, in turn, affixed to a vertical partition 162 inside housing 83. The shaft 156a of the motor protrudes through the bearing assembly 158 where it is attached to a generally circular housing 168. There is also a recess 169 in the end of shaft 156a. The housing 168 has an axial bore 172 which is stepped such that it has a small diameter section 172a for snugly receiving shaft 156a, a somewhat larger diameter section 172b and a still larger diameter section 172c. The wall of the bore section 172c is threaded to accommodate the threaded neck of a dome-shaped plug 174. When the plug is in place, an axial boss 174a thereon closes off the recess 169 in the motor shaft, thereby forming a cavity inside housing 168. In use, a suitable radiation source such as a small amount of cesium 137 is placed in the cavity.

The bearing assembly 158, housing 168 and plug 174 are relatively massive and are constructed of a suitable radiation shielding material so that the radiation from the source is, for the most part, contained within the cavity. However, there is a small passage 182 in the housing 168 wall through which photons emerge from the cavity as a beam and strike the wall of pipe 10. The passage is oriented such that the photons are scattered back toward counter 154 which then develops an electrical output that varies in accordance with the amount of radiation incident upon it. To achieve a relatively high signal-to-noise ratio, the system should take on the order of 5600 counts per sample. Also, it is desirable to detect a wall thickness change of about 10%. Therefore, a typical system should be able to sense a 4% change in the counter 154 count.

The output of the counter is converted to an FM signal by electrical components mounted on printed circuit cards 184 located to the rear of plug 174. Power is supplied to the motor 156 and printed circuit cards 184 by batteries 186 mounted at the base of unit 54 inside a recess 188 formed for that purpose in neck 74.

Turning again to FIG. 3, the output of the scintillation counter 154 is applied to a threshold circuit 192 so that the system responds only to a selected radiation count above the background level. The output of the threshold circuit 192 is a Poisson distribution of pulses which are applied to a one-shot multivibrator 194 giving all of these pulses the same amplitude. The squared-off pulses are then coupled to a low-pass filter 196 which averages the pulses over a selected time interval, on the order of 0.5 milliseconds, to produce a reasonable signal for the recording system. The resultant signal is used to control a voltage-controlled oscillator 198 whose output is therefore a frequency-modulated signal reflecting the radiation count. This output is applied to the tape recorder 116 where it is impressed on TRACK 3 of the tape.

After the pipeline is surveyed, the cassette 118 is removed from the pig and the signals recorded on the tape are analyzed by a playback analyzing unit shown generally at 202 in FIG. 3. This unit may be a self-contained piece of electronic equipment which can be operated in the field. However, for more extensive processing of the recorded information, the unit is better located at a central processing laboratory. The function of the playback analyzing unit is to replay the tape cassette 118 and process the recorded signal data so that this data can be interpreted as to the existence or non-existence of leaks and incipient leaks in the pipeline and as to the precise location of these problem areas. In its simplest form, this function is performed by demodulating the recorded FM signals on the tape and displaying the data as an accurate pressure-versus-time record and radiation count-versus-time record as shown in FIG. 1. Thus, in this case, the unit may consist simply of a tape deck with suitable electronics for demodulating the FM signals on the tape and a three-trace pen chart recorder, one trace displaying the pressure record, the second trace displaying the radiation count record and the third trace displaying the elapsed time record.

More preferably, the playback analyzer unit has provision for automatic tape playback and a thresholding capability. This allows the operator or interpreter to scrutinize only those portions of the tape record which are suspect. In other words, the analyzer unit 202 plays back the record automatically and signals the operator only when it detects a transient in the recorded signals of the type which is characteristic of a leak or an incipient leak. In practice, then, a substantial pipeline leak would produce a relatively high transient signal, while a smaller leak might have a transient characteristic similar to a T or a valve. However, these permanent fittings can be identified quickly because the operator can determine their exact location from a plan of the pipeline or from the records of previous runs through the same pipeline.

Also, suspect transients can be over-recorded with a pen chart recorder at matched speeds relative to recordings of prior runs through the pipeline to clearly identify the changes which have occurred in the transient characteristics for that particular section of pipe which is suspect.

The playback analyzer 202 includes a tape deck 204 capable of reading the three recording tracks on the tape in the cassette 118 (FIG. 2). The TRACK 1 signal carrying the dynamic pipeline pressure information is applied to a discriminator 206 and a high pass filter 208 to retrieve the dynamic component. This signal may be distorted due to flutter noise. In order to remove this noise, the signal is applied as the numerator input to an analog divider 210. Then the FM signal on TRACK 2 of the tape which carries the timing information is played back simultaneously and applied to a discriminator 212. The output of the discriminator 212 is a voltage which is proportional to tape speed, including any flutter component. This voltage is applied as the denominator input to divider 210. Consequently, the output of the divider is a signal which carries the dynamic pipeline pressure information, but which is devoid of flutter noise. This signal is then applied to a suitable display apparatus 214 such as a pen chart recorder, a cathode ray tube display or the like.

To recover the static component of the pressure signal, the TRACK 1 signal is processed by a discriminator 216 followed by a low pass filter 218. To eliminate the noise component of this signal, it is coupled to an analog divider 222 where it is divided by the output of discriminator 212 following which it is fed to display apparatus 214. There it may be summed with the output from divider 210 with the resultant signal being used to drive the stylus of a pen chart recorder to develop a plot such as the FIG. 1 curve A.

In order to give the system its automatic thresholding capability, the divider output is fed to a differentiator 224 which responds only to pressure transients. The differentiator output is applied by way of an adjustable threshold control 226 to an alarm 228. By proper adjustment of the threshold control 226, the alarm 228 can be activated only when the system detects a pressure transient which exceeds some selected minimum value which is characteristic of the leak. As soon as the alarm sounds, the operator is apprised of a possible problem. Also, unit 202 immediately stops, allowing the operator to reverse the tape and play back the suspect portion of the record so that he can observe it directly on the display apparatus 214. Otherwise, of course, the operator need not look at the display so that he is free to do other things. Of course, the operator, if he chooses, can also listen to the signal recorded on the tape and actually hear the frequency changes due to the pipeline characteristics.

Preferably, the signal on the TRACK 2 is applied to the display 214 by way of a frequency divider 232 so that the display provides a visual indication of elapsed time.

The signal on the TRACK 3 carrying the information relating to the wall thickness of the pipeline is retrieved by a discriminator 234 and filter 236 and applied to an analog divider 238 which receives the signal from discriminator 212. Thus, the output of the divider 238 is a voltage proportional to the count of counter 154 (FIG. 2) and which is devoid of flutter noise.

This signal is applied to an averaging filter 242 so that the output of the filter is a voltage which represents a continuous average over a selected time interval, e.g. the last 5.3 milliseconds of information. This voltage is coupled to the display 214 and can be used, for example, to drive a recorder stylus to develop a plot such as curve B in FIG. 1. An automatic thresholding arrangement similar to the one described above can also be used here if desired.

Since the pipeline fluid velocity will vary from time to time, a single conversion of time to distance is not always possible. time/distance correlations can be made for any point in the pipeline from the flow rate, pipe diameter and from the known positions of fittings such as elbows, valves and the like, each of which has a characteristic signature on the pressure and acintillation count records. Also, while changes in fluid viscosity may affect the absolute values of recorded signals, they will not change the characteristic pipeline profiles. Accordingly, the analyzing unit 202 can still enable one to immediately recognize a leak and even estimate its magnitude and determine its precise location in the pipeline.

Thus, the present system takes advantage of the fact that each pipeline has a unique pressure versus time profile and a unique scintillation count versus time profile and that each leak or incipient leak in the pipeline produces a characteristic transient. The system responds to these transients and signals the operator. Accordingly, the operator does not have to scrutinize reams of recorded data. Yet there is a minimum risk that a problem in the pipeline will be overlooked.

While it has the aforesaid advantages, the present system is reliable and relatively inexpensive. One prime reason for this is the fact that the pig can be accommodated to a wide variety of pipe diameters. Another is the fact that it uses standard low cost parts. In addition, a single analyzer unit can be located centrally and process the information from many different pig recorders.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described.

I claim:

1. A pipeline condition analyzer comprising
  A. pigging apparatus for isolating a segment of pipe as it moves through the pipe,
  B. a pressure detector on board the pig for sending the pressure in the isolated pipe segment and developing an electrical signal proportional thereto,
  C. and means on board the pig for continuously recording the pressure signal on a recording medium so as to develop a pressure profile for the pipeline,
  D. said pigging apparatus including
    1. a capsule containing the pressure detector and recorder and whose cross section is smaller than the smallest pipe whose condition is to be analyzed, and
    2. a removable sleeve encircling the capsule, the opposite ends of the sleeve having outwardly projecting seals arranged for sealing engagement with the interior wall of the pipe whose condition is to be analyzed.

2. The analyzer defined in claim 1 wherein the signal recorded on the medium is a tone which is modulated by the signal from the pressure detector.

3. The analyzer defined in claim 2 wherein the recording means is a tape recorder arranged to record the frequency modulated signal.

4. The analyzer defined in claim 1
  A. wherein the capsule is composed of two axially separable sections, and
  B. further including means for locking the two sections together.

5. The analyzer defined in claim 1 and further including
  A. display apparatus,
  B. means for playing back the signals on the recording medium, and
  C. means for applying the signals to the display apparatus so that the apparatus displays the pipe pressure profile.

6. The analyzer defined in claim 5 and further including
  A. means responsive to transients in the signal being played back by the playback means,
  B. alarm means, and
  C. means for actuating the alarm means whenever the transients detected by the transient responsive means exceed a selected value.

* * * * *